United States Patent [19]
Blaner et al.

[11] Patent Number: 6,157,981
[45] Date of Patent: Dec. 5, 2000

[54] REAL TIME INVARIANT BEHAVIOR CACHE

[75] Inventors: Bartholomew Blaner, Underhill Center; Henry Harvey Burkhart, Underhill; Robert Dov Herzl, South Burlington; Kenneth Anthony Lauricella, Colchester; Clarence Rosser Ogilvie, Huntington; Arnold Steven Tran, South Burlington, all of Vt.

[73] Assignee: International Business Machines Corporation, Armonk, N.Y.

[21] Appl. No.: 09/085,956

[22] Filed: May 27, 1998

[51] Int. Cl.[7] ....................................................... G06F 12/00
[52] U.S. Cl. ................................. 711/3; 711/123; 711/201; 711/206; 711/220
[58] Field of Search .................................... 711/202, 203, 711/208, 123, 220, 206, 3, 201, 209

[56] References Cited

U.S. PATENT DOCUMENTS

| | | | |
|---|---|---|---|
| 3,979,726 | 9/1976 | Lange et al. | 711/135 |
| 4,654,782 | 3/1987 | Bannai et al. | 711/3 |
| 4,885,680 | 12/1989 | Anthony et al. | 711/144 |
| 5,132,927 | 7/1992 | Lenoski et al. | 365/49 |
| 5,179,681 | 1/1993 | Jensen | 711/118 |
| 5,210,841 | 5/1993 | Johnson | 711/3 |
| 5,274,834 | 12/1993 | Kardach et al. | 710/260 |
| 5,526,320 | 6/1996 | Zagar et al. | 365/233.5 |
| 5,564,030 | 10/1996 | Whitted, III et al. | 711/201 |
| 5,568,442 | 10/1996 | Kowalczyk et al. | 365/230.03 |
| 5,586,293 | 12/1996 | Baron et al. | 711/118 |
| 5,623,621 | 4/1997 | Garde | 711/220 |
| 5,636,224 | 6/1997 | Voith et al. | 714/701 |
| 5,640,533 | 6/1997 | Hays et al. | 711/133 |
| 5,652,872 | 7/1997 | Richter et al. | 395/500.47 |
| 5,940,873 | 8/1999 | Mou | 711/208 |
| 5,968,145 | 10/1999 | Maeda et al. | 710/28 |

OTHER PUBLICATIONS

Mitsubishi Microcomputers M3Z000D4AFP, Single–Chip 32–bit CMOS microcomputer, Mitsubishi Electric, entirety, Aug. 1997.

Jim Handy, "The Cache Memory Book", Academic Press, pp 48–50 and 60–62, 1993.

Intel, Microprocessors, vol. I, Intel Corp, pp 2–36 thru 2–41, 1992.

M. Morris Mano, "Computer System Architecture", Prentice–Hall, Inc, p. 122, 1976.

*Primary Examiner*—Do Hyun Yoo
*Assistant Examiner*—Hong Kim
*Attorney, Agent, or Firm*—McGuireWoods; Robert A. Walsh, Esq.

[57] ABSTRACT

A memory and memory architecture for use by a processor executing real time code and a system on a chip including the processor and memory containing the code. An effective address is maintained in a cache directory. In the preferred embodiment memory, individual functions are loaded into physical memory at permanently selected locations and selected by the effective address in the cache directory. By preselecting task storage locations, system performance may be tuned or optimized to assure predictable performance or task execution.

11 Claims, 4 Drawing Sheets

REAL TIME INVARIANT BEHAVIOR CACHE

BACKGROUND OF THE INVENTION

1. Field of the Invention

The present invention generally relates to cache memory and verification and more particularly to a cache memory architecture for digital signal processors.

2. Background Description

State of the art Modems, such as those used in network servers or in home or laptop computers, require high performance signal processing, typically a digital signal processor (DSP). Consequently, these high performance DSPs require high performance static random access memory (SRAM). These SRAMs must have a very short single cycle access capability so that a given piece of code may be executed in a specific time period, i.e., meet a deadline. It is desirable that the duration of execution is predictable and consistent with every execution, i.e., is time invariant.

Typically, a worst case execution time of a particular piece of code must also have a known limit such that worst case time may be determined in advance. This property is referred to as determinism. Although achieving determinism (i.e., this time invariant behavior) is possible using single cycle SRAM, it is also very expensive. This is true, especially because SRAM is expensive compared to Dynamic Random Access Memory (DRAM).

Attempts to reduce modem memory cost by using a hierarchical memory, such as a caching slower, cheaper memories such as DRAM for these high performance DSPs, has resulted in processor stalls. Consequently, timing and frequent processor stalls are fundamental problems that must be addressed when trying to achieve time invariant real time system behavior using cheaper memory.

Further, if these processor stalls were not unpredictable, but occurred repeatably from one task load and execution to the next, then system programmers could plan for them. Then, code placement could be optimized in the system's effective address space in order to achieve repeatable behavior from one main memory task load to the next.

Unfortunately, typical state of the art modems have functions that each may include several tasks. These tasks are segmented into data and instruction task segments. With these typical state of the art modems, task execution and, therefore, system performance is dependant upon the alignment of task segments of a multi-segment task loaded into a conventional cache memory. Optimum performance is achieved when the segments of one task load and execution are aligned such that they are contained in and distributed throughout the cache, completely fitting in the cache.

Thus, for example, one task load and execution may load optimally into the cache in a first instance. However, in a second load, all segments might instead align in the bottom sets of the cache resulting in what is known in the art as thrashing. As a consequence of thrashing additional cycles are required to execute the same task or function.

In a real time system, these extra cycles may cause missed deadlines. Consequently, the missed deadlines make predicting individual task performance very complex and difficult, which is an intolerable situation.

Thus, there is a need for a low cost deterministic memory hierarchy and architecture.

SUMMARY OF THE INVENTION

It is therefore a purpose of the present invention to allow for consistent temporal execution of a task in a system with a memory hierarchy.

It is another purpose of the present invention to make modem performance predictable.

It is yet another purpose of the present invention to improve modem task execution performance.

The present invention is a memory and memory architecture for use by a processor executing real time code and a system including the processor and memory containing the code. An effective address is maintained in a cache directory. In the preferred embodiment memory, individual functions are loaded into physical memory at permanently selected locations and selected by the effective address in the cache directory. By preselecting task storage locations, system performance may be tuned or optimized to assure predictable performance or task execution.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
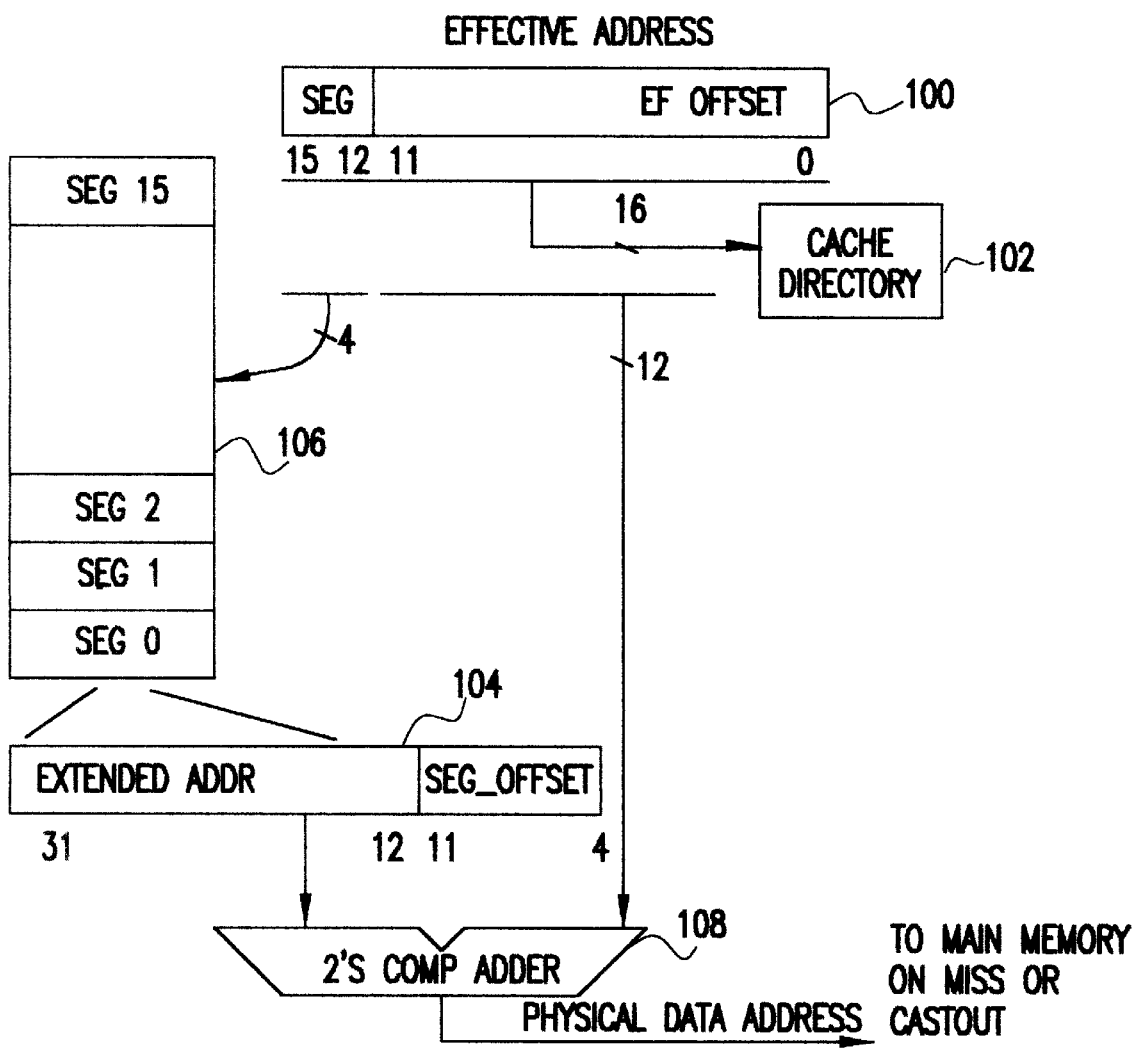
FIG. 1 shows a preferred embodiment cache architecture for providing invariant behavior.

Referring now to the drawings, and more particularly to FIG. 1 which shows the preferred embodiment cache architecture for providing time invariant behavior. In the preferred embodiment, effective addresses, e.g. 100, including an effective address offset (Ef_Offset) and a segment address (Seg) are stored in each location in a cache directory 102 instead of storing physical addresses as in a conventional system. Extensions, e.g. 104, each including an extension address (Extended Addr) and a segment offset (Seg_Offset) are maintained in a segment register 106 and selected by a segment address (Seg). When it is necessary to access main memory, a Physical Address is derived from an effective address 100.

Each Physical Address is calculated in a twos (2s) complement adder 108 combining an effective address offset, Ef_Offset, with a corresponding extension address, Extended Addr, as selected by the effective address 100. Typical segment memory accesses, all of which are multi cycle accesses, occur on cache misses, cast-outs and upon accessing noncacheable regions.

The preferred embodiment cache architecture allows a task segment to be placed anywhere in task memory as long as the task segment is aligned on a memory access (e.g., a memory page, row access) size modulo. Individual functions are loaded into physical memory at permanently selected locations and selected by the effective address in the cache directory. In the preferred embodiment cache architecture segment memory may be any type of comparatively slow memory including extended data out (EDO) DRAM or synchronous DRAM (SDRAM).

Thus, the preferred embodiment cache architecture allows packing modem instructions and data code segments in main memory in sizes that are more compatible with the natural boundaries of a memory chip's architecture, e.g., in 1 KByte (1 KB) pages. Thus, the packed instructions and code segments may be accessed with only a modulo of the memory access page size in the placement provided the task code is executed at the same effective address. Such a task will have the same performance every time. Further, tasks can be developed with optimal segment placement in effective address space relative to the cache with these effective addresses never changing.

When the preferred embodiment task loader loads a segment into memory, the task can be loaded anywhere along a physical memory access boundary. Then, the task loader can bind the task segment in physical memory to the effective address space in the segment register. Again, the effective address attached to the cache directory does not change. The fact that the effective address does not change also relieves the task loader from requiring an address fix up phase for each code load, as would be required for prior art architectures.

Figure 2:
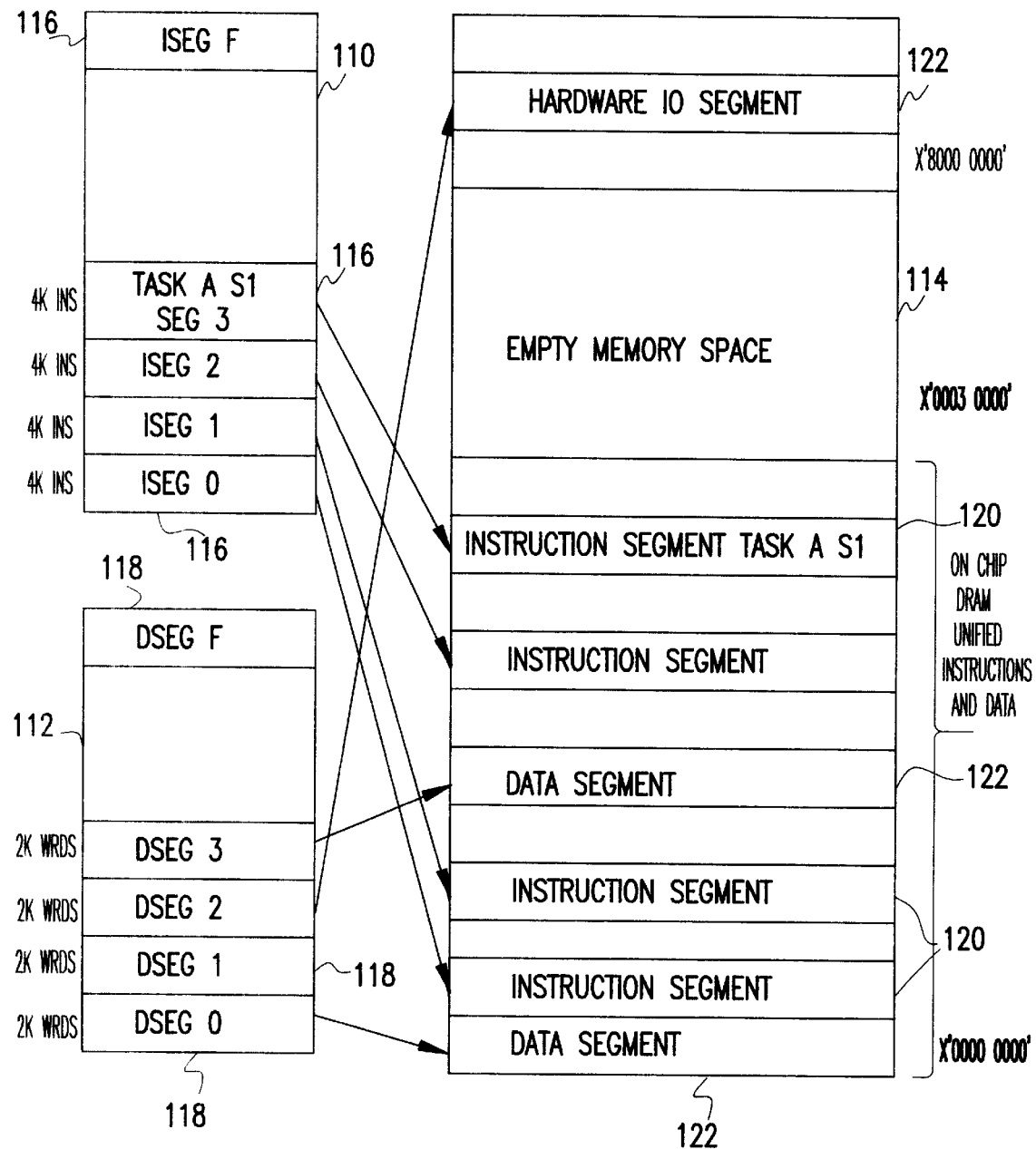
FIG. 2 shows the relationship of the Instruction Effective Address Map, the Data Effective Address Map, and the Physical Memory Map in the preferred embodiment cache architecture.

Thus, as can be seen from the example of FIG. 2, the preferred embodiment architecture includes an Instruction Effective Address Map 110, a Data Effective Address Map 112, and a Physical Memory Map 114. The Instruction Effective Address Map 110 includes several instruction segments 116 from, potentially, several tasks. The location or address of these segments in the effective address map never changes. Writing a task places the task in an optimal location with an associated task segment always being referenced at this location. Also, the cache directory 102 always references segment 116 in the same location resulting in consistent execution times for each executing task.

The Data Effective Address Map 112, like the Instruction Effective Address Map 110, includes several data segments 118 from, potentially, several tasks. In exactly the same way that the instructions never change locations, the data is also maintained in the same position for consistent execution.

The actual locations for task instructions 120 and data 122 are held in the Physical Memory Map 114. The task loader freely places task segments almost anywhere in physical memory and simply "Binds" the addresses back to effective address space. This Binding of the addresses gives the appearance of task segments being in the same location in the effective address while allowing the Physical Address to change.

The expected effective address offset for the start of a segment is subtracted from the actual physical address where the segment was placed to Bind the address. The resultant value is loaded into the corresponding segment register 106.

Figures 3, 3A:
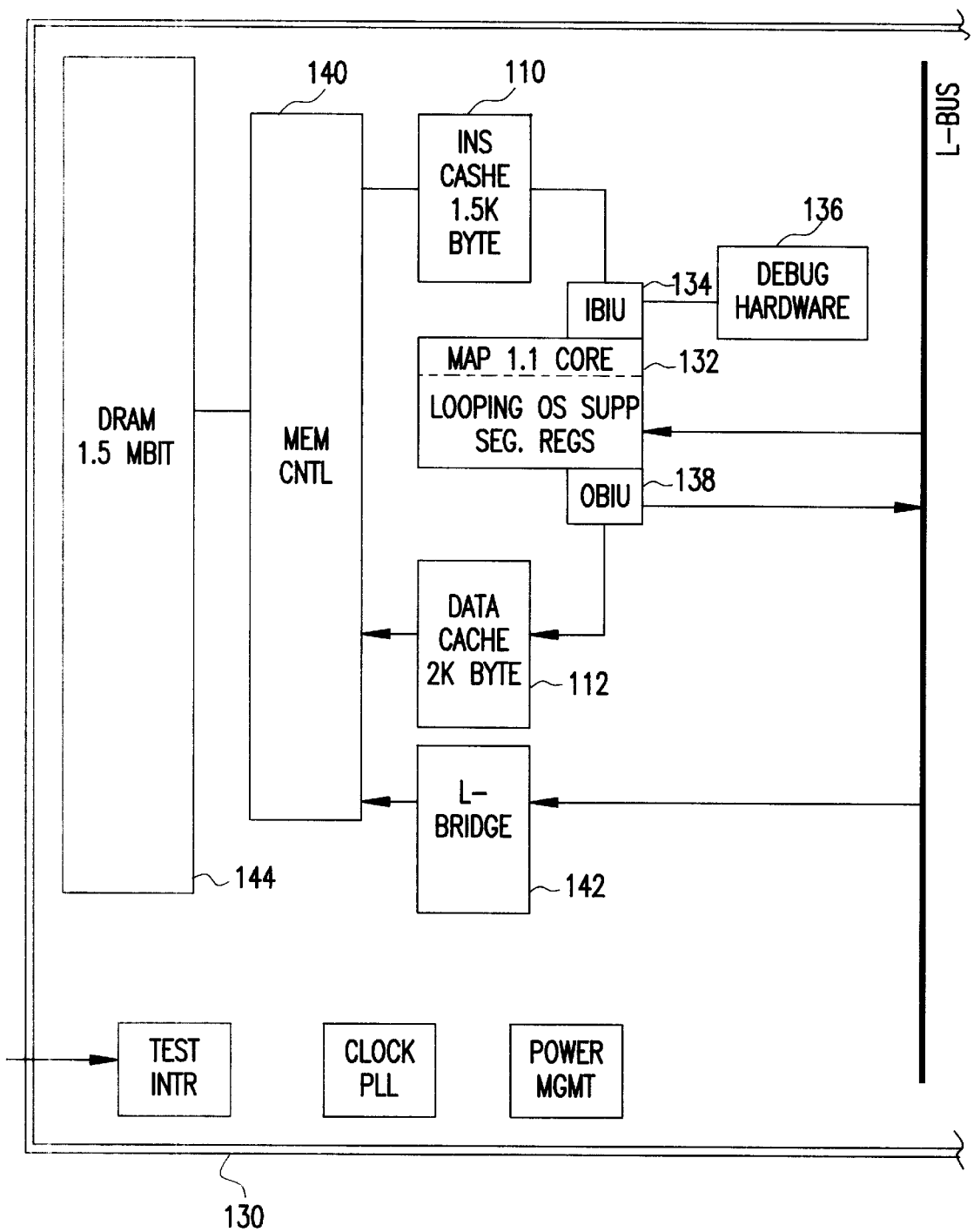
FIGS. 3, 3A & 3B show a preferred embodiment DSP system on a chip including a real time invariant behavior cache.
Figure 3B:
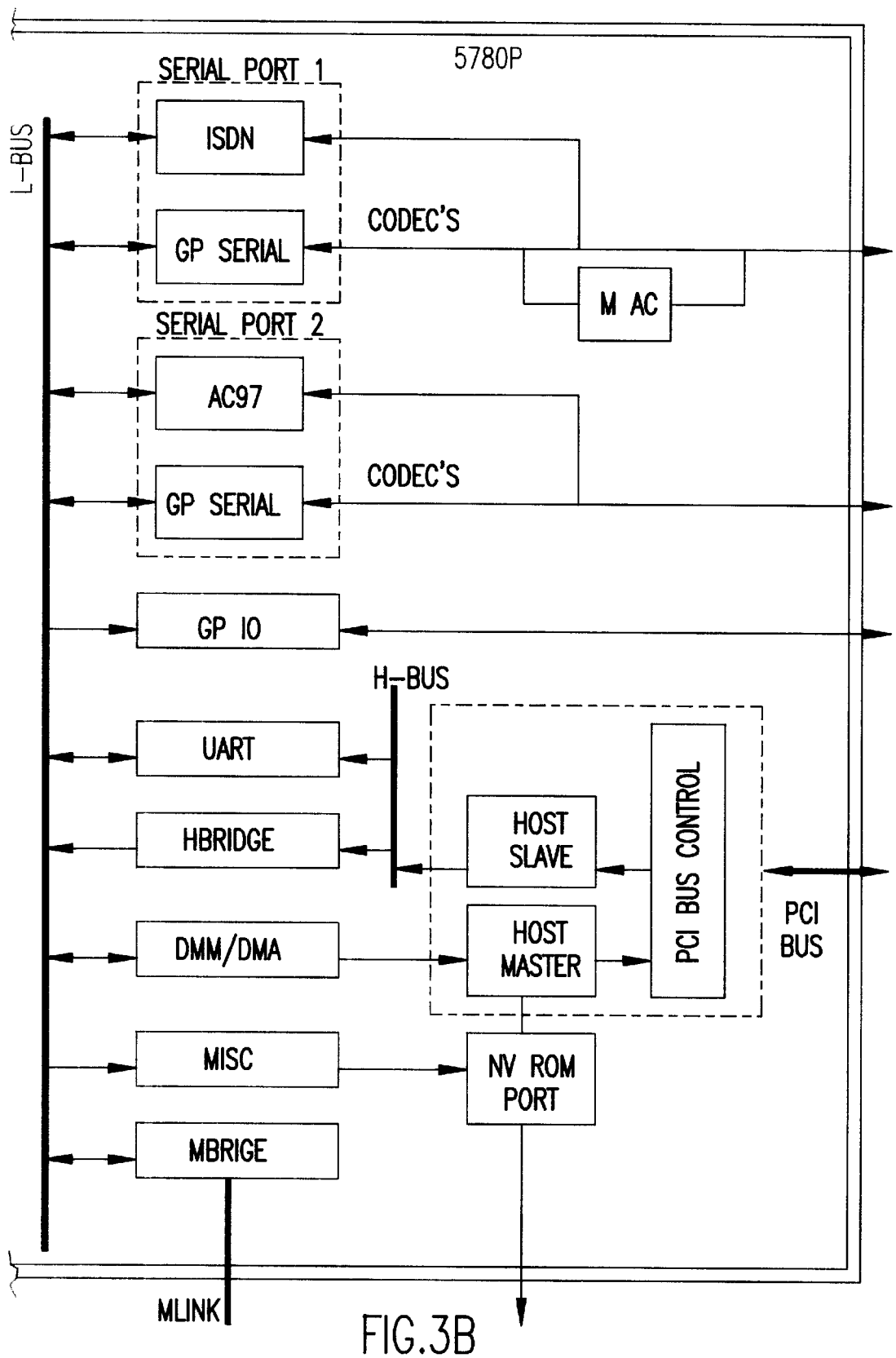

FIG. 3 shows a preferred embodiment DSP system on a chip 130 including a real time invariant behavior cache. The preferred embodiment chip 130 includes a core central processing unit (CPU) 132 interfacing to devices external to the chip 130 through peripheral support devices through a local bus (L-bus). An instruction bus interface unit (Ibiu) 134 passes instructions from instruction cache 110. The instruction cache 110 may be bypassed to pass instructions from the L-bus to the Ibiu through debug logic 136. A data bus interface unit (Dbiu) 138 passes data from data cache 112. The data cache 112 may be bypassed to pass data directly from the L-bus. Effective addresses for instructions from instruction cache 110 and data cache 112 are passed to a Memory Controller 140 as shown in FIG. 1, which includes the Physical Memory Map 114. Bus bridge logic 142 couples the L-bus to the Memory Controller 140, to bypass the CPU 132, instruction cache 110 and data cache 112. The Memory Controller 140 passes computed physical addresses to on-chip physical memory 144.

Thus, as a result of the present invention, a real time task performed with a preferred embodiment cache architecture will run faster because the segment register access has been removed from a critical timing path of the processor.

While the invention has been described in terms of preferred embodiments, those skilled in the art will recognize that the invention can be practiced with modification within the spirit and scope of the appended claims.

We claim:

1. A cache memory including a plurality of addressable locations, said cache memory further comprising:
   an effective address cache for storing a plurality of effective addresses;
   a segment register array for storing a plurality of address segments;
   a memory array, said memory array being a physical memory for storing cached data and instructions; and
   means for combining a selected effective address with a selected segment to provide a physical memory address to said physical memory,
   wherein a program executing said data and instructions in a plurality of executions occupies the same effective address space for each of said plurality of executions thereby achieving consistent execution within a specified time period.

2. The cache memory of claim 1 wherein the effective address cache includes an instruction effective address cache and a data effective address cache.

3. The cache memory of claim 2 wherein the memory array is a dynamic random access memory (DRAM).

4. The cache memory of claim 3 wherein the DRAM is extended data out (EDO) DRAM.

5. The cache memory of claim 4 wherein the DRAM is synchronous DRAM.

6. The cache memory of claim 2 wherein the means for combining is a twos complement adder.

7. An integrated circuit chip comprising:
   a central processing unit (CPU);
   an instruction effective address cache receiving instruction addresses from said CPU;
   a data effective address cache receiving data addresses from said CPU;
   a memory controller receiving effective addresses from said instruction effective address cache and said data effective address cache, said memory controller generating a physical memory address from each said received effective address; and
   a memory array receiving said generated physical memory address and, responsive thereto, providing instructions or data to a physical memory,
   wherein a program executing said data and instructions in a plurality of executions occupies the same instruction effective address space and the same data effective address space for each of said plurality of executions thereby achieving consistent execution within a specified time period.

8. The integrated circuit of claim 7 further comprising:
   an instruction bus interface unit providing an instruction cache address to said instruction effective address cache; and
   a data bus interface unit providing an data cache address to said data effective address cache.

9. The integrated circuit chip of claim 7 wherein the memory array is a dynamic random access memory array.

10. The integrated circuit chip of claim 7 wherein the memory controller comprises:
- a segment register for storing a plurality of address segments; and
- means for combining a selected effective address with a selected segment to provide a physical memory address to said physical memory.

11. A modem on the integrated circuit chip as in claim 7, further comprising a local bus on said integrated circuit chip connecting said CPU to peripheral support devices on the integrated circuit chip, said peripheral support devices for interfacing to devices external to the modem.

* * * * *